United States Patent
Amaki et al.

(10) Patent No.: US 10,191,688 B2
(45) Date of Patent: Jan. 29, 2019

(54) MEMORY SYSTEM AND INFORMATION PROCESSING SYSTEM

(71) Applicant: Toshiba Memory Corporation, Tokyo (JP)

(72) Inventors: Takehiko Amaki, Yokohama Kanagawa (JP); Toshikatsu Hida, Yokohama Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 0 days.

(21) Appl. No.: 14/793,365

(22) Filed: Jul. 7, 2015

(65) Prior Publication Data
US 2016/0266792 A1 Sep. 15, 2016

(30) Foreign Application Priority Data
Mar. 12, 2015 (JP) ................. 2015-049330

(51) Int. Cl.
| G06F 12/00 | (2006.01) |
| G06F 13/00 | (2006.01) |
| G06F 13/28 | (2006.01) |
| G06F 3/06 | (2006.01) |
| G06F 12/02 | (2006.01) |

(52) U.S. Cl.
CPC ............ *G06F 3/0652* (2013.01); *G06F 3/064* (2013.01); *G06F 3/0608* (2013.01); *G06F 3/0616* (2013.01); *G06F 3/0679* (2013.01); *G06F 12/0246* (2013.01); *G06F 12/0253* (2013.01); *G06F 2212/7201* (2013.01); *G06F 2212/7205* (2013.01)

(58) Field of Classification Search
CPC ................. G06F 12/0246; G06F 12/0253
USPC .................................... 711/103, 165
See application file for complete search history.

(56) References Cited

U.S. PATENT DOCUMENTS

| 2002/0019716 | A1* | 2/2002 | Agesen ............... G06F 11/3447 702/83 |
| 2007/0186032 | A1* | 8/2007 | Sinclair ................. G06F 3/0605 711/103 |
| 2008/0294813 | A1* | 11/2008 | Gorobets ............ G06F 12/0246 710/62 |
| 2009/0265403 | A1* | 10/2009 | Fukumoto ........... G06F 12/0246 |
| 2013/0036278 | A1 | 2/2013 | Strzelczak et al. |
| 2013/0326128 | A1 | 12/2013 | Gorobets |
| 2014/0281121 | A1* | 9/2014 | Karamcheti ............ G06F 3/061 711/102 |
| 2014/0365719 | A1 | 12/2014 | Kuzmin et al. |

* cited by examiner

*Primary Examiner* — Edward J Dudek, Jr.
*Assistant Examiner* — Sidney Li
(74) *Attorney, Agent, or Firm* — Patterson & Sheridan, LLP

(57) ABSTRACT

According to one embodiment, a memory system includes a nonvolatile memory and a controller. The nonvolatile memory includes erase blocks. The controller is configured to provide a host device with first information. The first information is indicative of whether or not an erase block to which data associated with a first stream are written and data unassociated with the first stream are not written is used for a garbage collection operation of the nonvolatile memory.

20 Claims, 16 Drawing Sheets

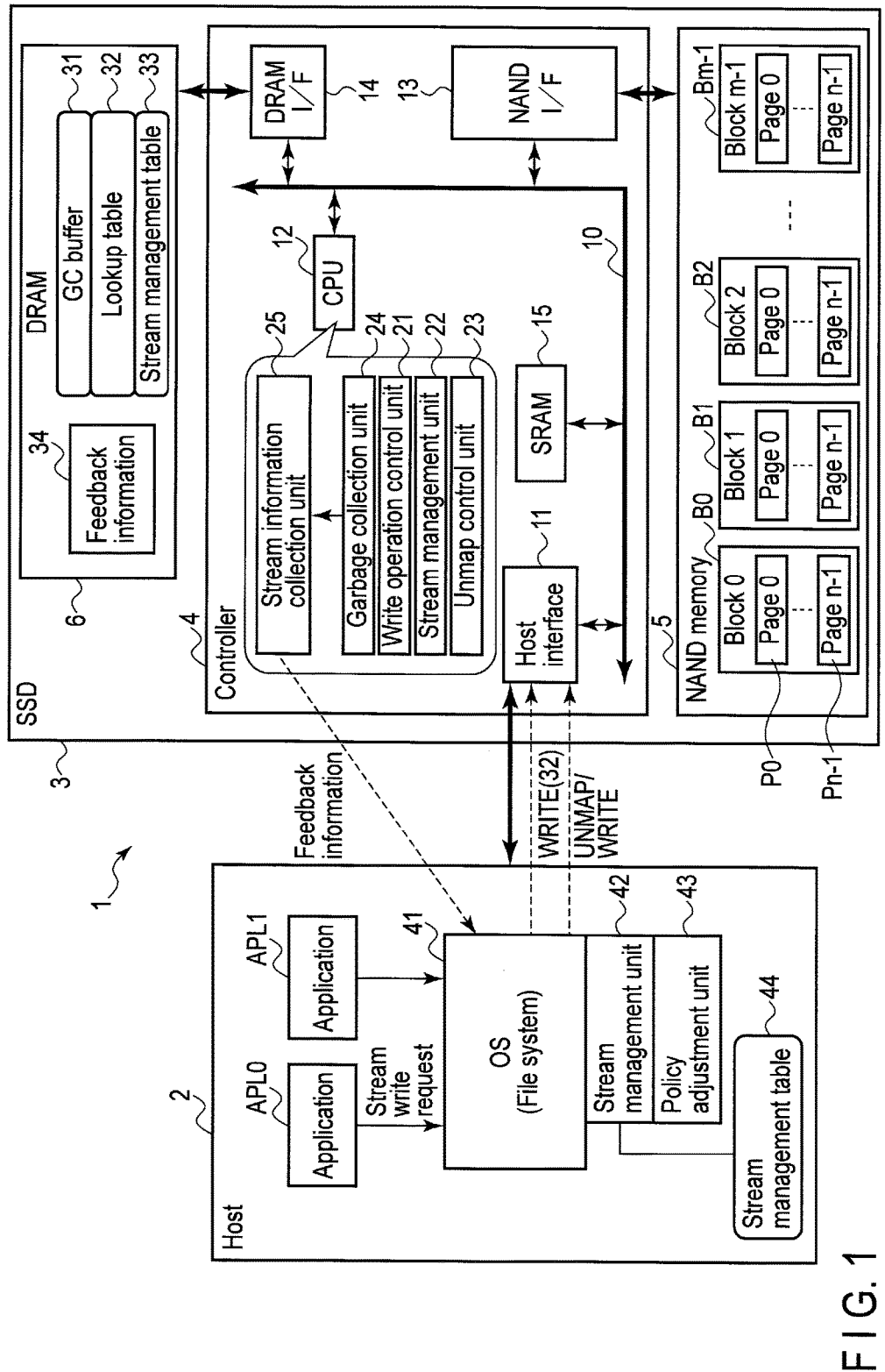
F I G. 1

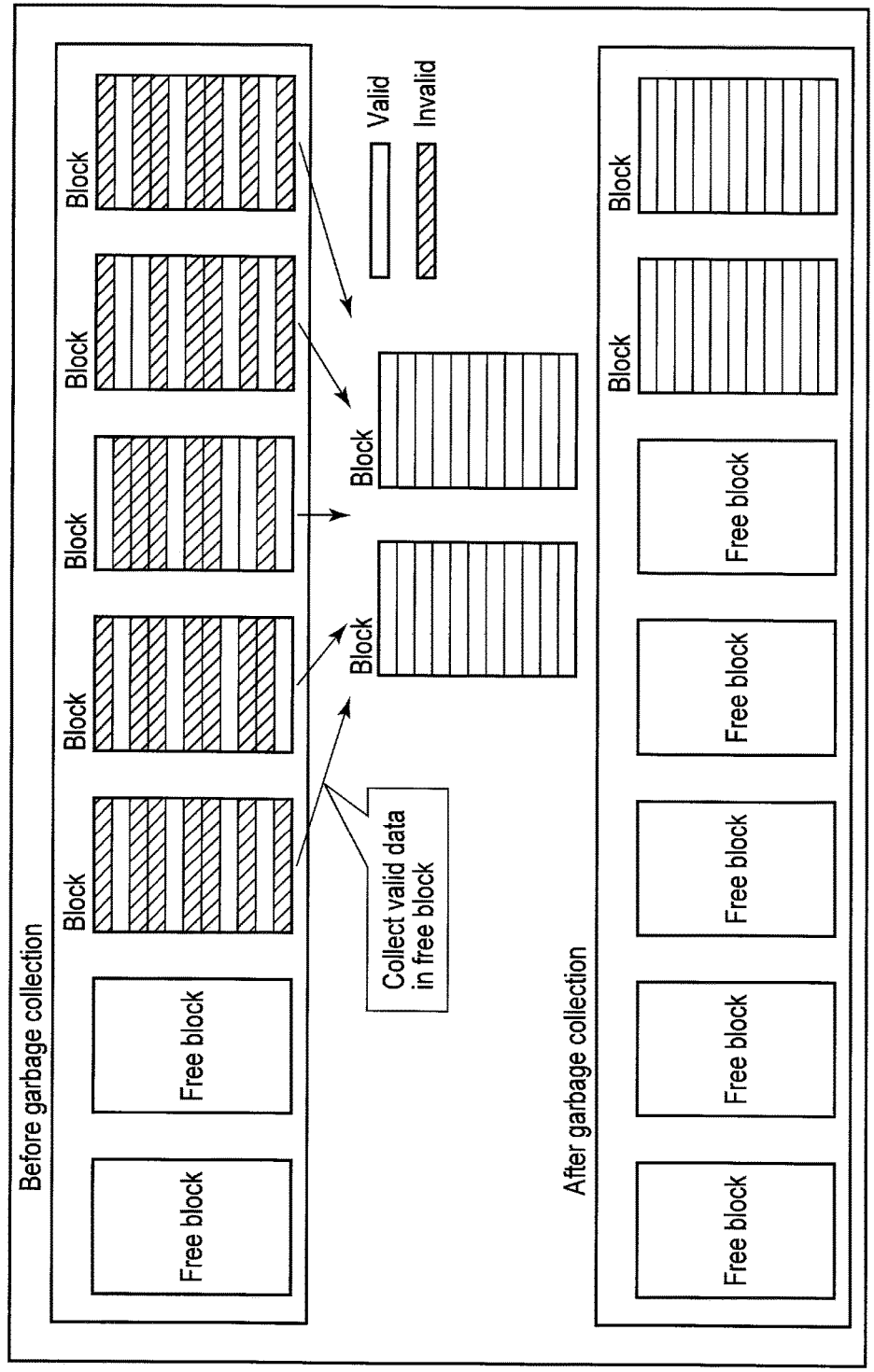
F I G. 2

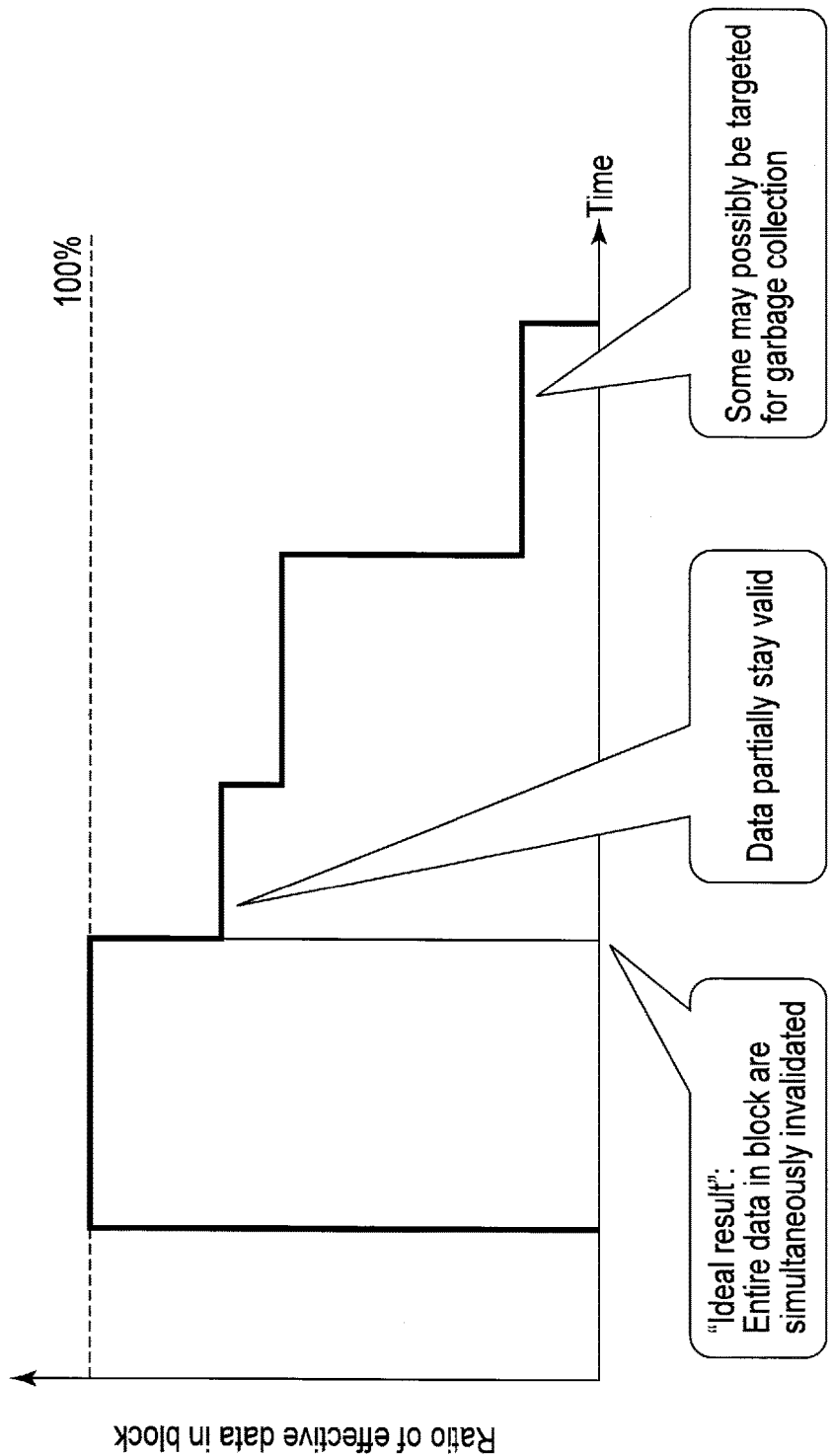
F I G. 5

Stream management unit at SSD side — 22

Stream management table — 33

| IDs of streams | Allocated erase blocks |
|---|---|
| 1 | B1, B3, B4 |
| 2 | B2 |
| ⋮ | ⋮ |

FIG. 8

Stream management unit at SSD side — 22

Stream management table — 33

| IDs of streams | IDs of applications | Allocated erase blocks |
|---|---|---|
| 1 | APL 0 | B1, B3, B4 |
| 2 | APL 1 | B2 |
| ⋮ | ⋮ | ⋮ |

FIG. 9

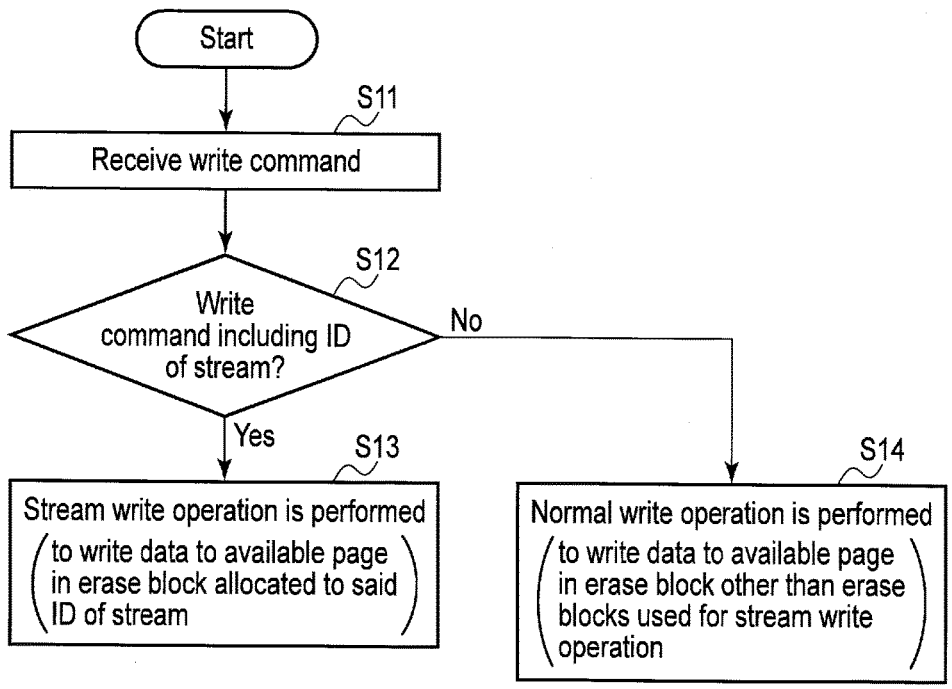
F I G. 10
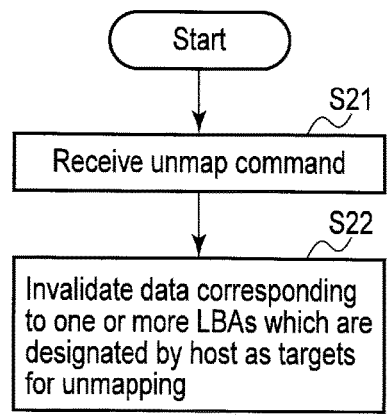
F I G. 11

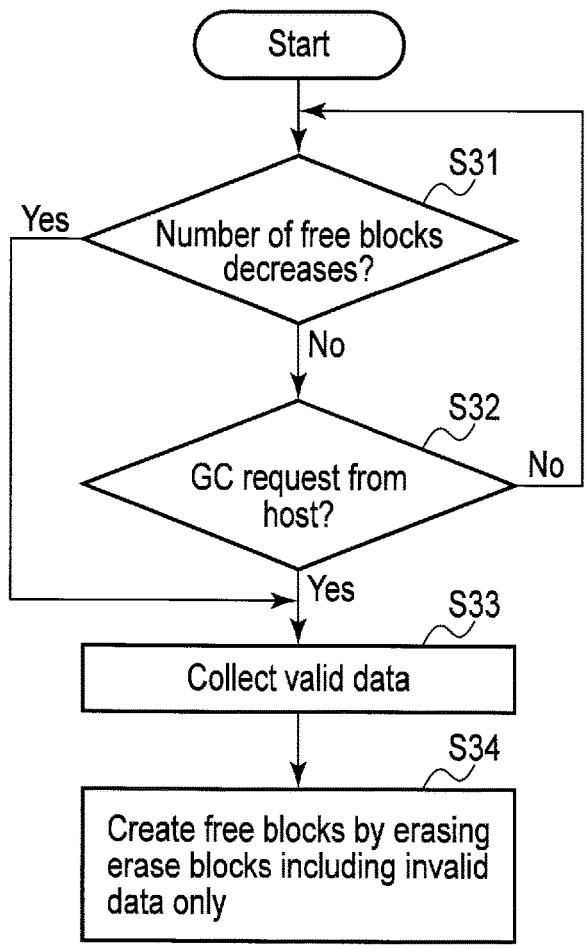
F I G. 12

Stream management unit at host side — 42

| IDs of policy | Issued IDs of streams |
|---|---|
| Policy #1 | ID1, ID2 |
| ⋮ | ⋮ |

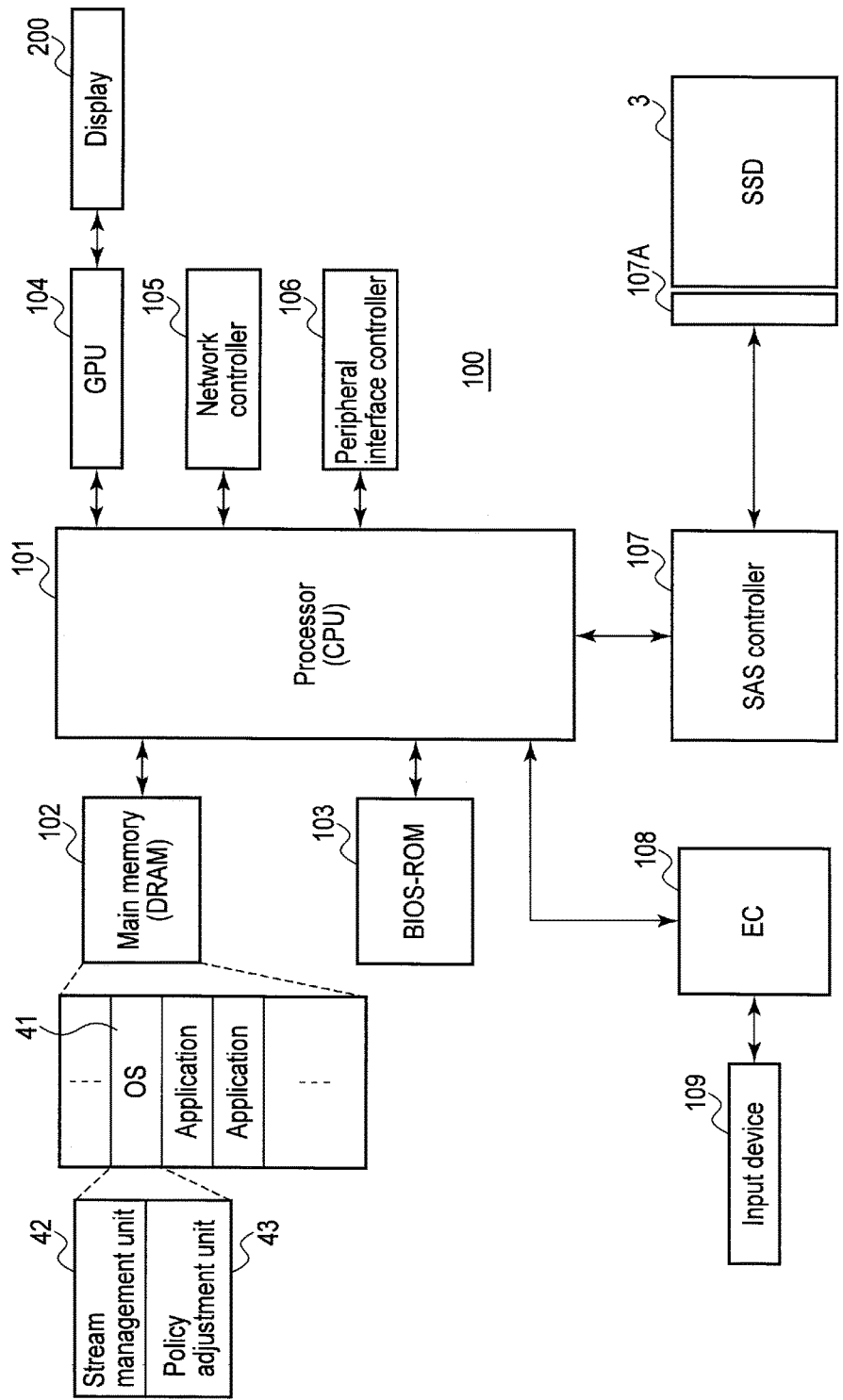
F I G. 18

MEMORY SYSTEM AND INFORMATION PROCESSING SYSTEM

CROSS-REFERENCE TO RELATED APPLICATIONS

This application is based upon and claims the benefit of priority from Japanese Patent Application No. 2015-049330, filed Mar. 12, 2015, the entire contents of which are incorporated herein by reference.

FIELD

Embodiments described herein relate generally to a technique for controlling a nonvolatile memory.

BACKGROUND

Recently, memory systems with a nonvolatile memory have been widely used.

As one of such memory systems, a solid-state drive (SSD) based on NAND flash technology is known. The SSD is used as a main storage for various kinds of computing devices because of its low power consumption and high performance.

As the latest trend, attempts to control the SSD under the initiative of a host are being made for improved SSD performance.

To improve the SSD performance by a host, a novel function to provide the host with effective information is required.

BRIEF DESCRIPTION OF THE DRAWINGS

FIG. 1 is an exemplary block diagram illustrating a structural example of a memory system of an embodiment.

FIG. 2 illustrates an example of a garbage collection operation executed by the memory system of the embodiment.

FIG. 5 illustrates an example of a process of invalidation of all data in an erase block allocated to a specific stream.

FIG. 8 illustrates an example of a data structure of the stream management information managed by the memory system of the embodiment.

FIG. 9 illustrates another example of the data structure of the stream management information managed by the memory system of the embodiment.

FIG. 10 is a flowchart which illustrates an example of a write command process executed by the memory system of the embodiment.

FIG. 11 is a flowchart which illustrates an example of an unmap command process executed by the memory system of the embodiment.

FIG. 12 is a flowchart which illustrates an example of a garbage collection operation executed by the memory system of the embodiment.

FIG. 16 illustrates another example of the data structure of the stream management information managed by the host of the embodiment.

FIG. 18 is a block diagram which illustrates an example of a hardware structure of the host of the embodiment.

DETAILED DESCRIPTION

Figure 3:
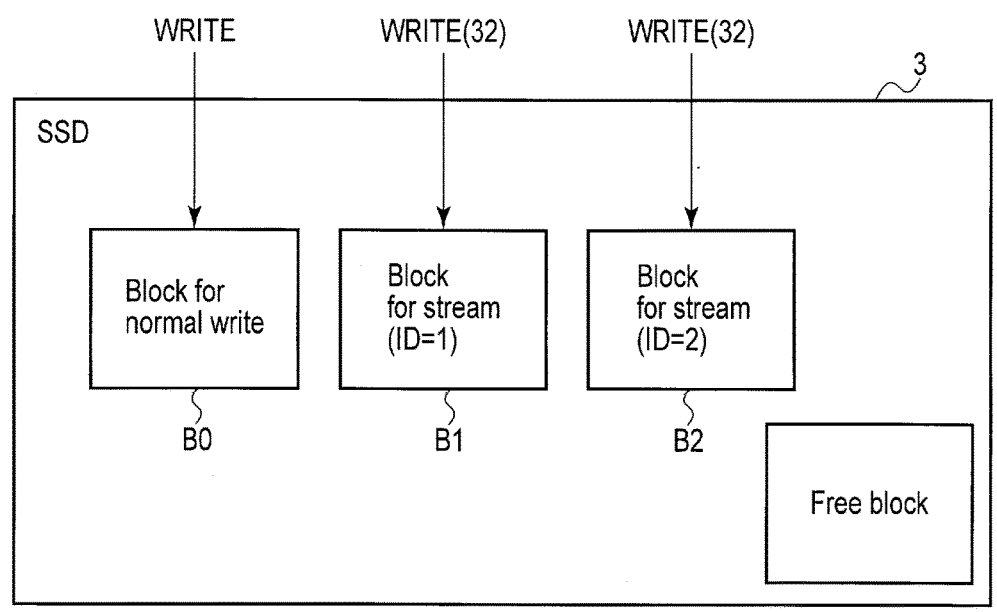
FIG. 3 illustrates an example of the relationship between the number of IDs of streams used and the number of erase blocks secured in the memory system of the embodiment.

In general, according to one embodiment, a memory system includes a nonvolatile memory and a controller. The nonvolatile memory includes erase blocks. The controller is configured to provide a host device with first information. The first information is indicative of whether or not an erase block to which data associated with a first stream are written and data unassociated with the first stream are not written is used for a garbage collection operation of the nonvolatile memory.

First, the structure of an information processing system 1 including a memory system of an embodiment will be explained with reference to FIG. 1.

The memory system is a semiconductor storage device configured to write/read data to/from a nonvolatile memory. The memory system is realized as, for example, a solid-state drive (SSD) 3 based on NAND flash technology.

The information processing system 1 includes a host (host device) 2 and the SSD 3. The host 2 is an information processing apparatus such as a personal computer or a server.

The SSD 3 may be used as a main storage of the information processing apparatus which functions as the host 2. The SSD 3 may be integrated into the information processing apparatus, or may be connected to the information processing apparatus via a cable or a network.

As an interface used for interconnection between the host 2 and the SSD 3, SCSI, Serial Attached SCSI (SAS), ATA, Serial ATA (SATA), PCI Express (PCIe), and the like can be used. Hereinafter, a case where the host 2 and the SSD 3 are connected via SAS is given as a principal example, although no limitation is intended thereby.

The SSD 3 includes a controller 4, NAND memory 5, and DRAM 6. The NAND memory 5 may be composed of NAND flash memory chips.

The NAND memory 5 includes a large number of erase blocks B0 to Bm−1. The erase blocks B0 to Bm−1 function as erase units. The erase block may simply be referred to as a block.

Erase blocks B0 to Bm−1 are composed of a large number of pages (physical pages). That is, each of erase blocks B0 to Bm−1 includes a large number of pages P0 to Pn−1. In the NAND memory 5, reading and writing are executed per page unit.

The controller 4 is electrically connected to the NAND memory 5. The controller 4 may function as a flash translation layer (FTL) configured to execute data management of the NAND memory 5 and block management of the NAND memory 5.

The data management includes, for example, (1) management of mapping between logical block address (LBA) space and physical locations of the NAND memory 5, (2) a process to hide read/write operation per page unit and erase operation per block unit.

Data write to a page is performed only once per erase cycle.

Thus, the controller 4 maps a write (overwrite) to the same LBA in a different page on the NAND memory 5. That is, the controller 4 writes data to the different page and then associates the LBA with the different page. The page with which the LBA was originally associated, that is, the old data are invalidated.

The block management includes, for example, management of bad blocks, wear-leveling, and garbage collection. The wear-leveling is performed to distribute program/erase cycles among erase blocks.

The garbage collection is an operation to create (reclaim) a free space from erase blocks each including valid data and invalid data. The garbage collection operation is performed to increase the number of free blocks in the NAND memory 5 by collecting valid data from erase blocks in which valid data and invalid data are mixed. In the garbage collection operation, the valid data are read from an erase block group in which the valid data and the invalid data are mixed. The read valid data are then written to certain erase block (e.g., free block). As a result of this copy (data movement), the valid data are collected in several specific erase blocks. The erase block group becomes empty after the copy of the valid data, and then, through an erasing process, the erase block group can be reused as free blocks.

However, the garbage collection operation may keep the SSD 3 busy, and the data movement may trigger increase of the number of internal data writes.

To suppress the frequency of the garbage collection operation, the controller 4 supports a stream write operation along with a normal write operation.

In the stream write operation, data with the same ID of stream (same stream identifier) designated by the host 2 (that is, data that have the same expected life time) are written to the same erase block. In the normal write operation, data with no stream ID are written to a next available page in any erase block which is not allocated to the stream write operation.

The host 2 allocates the data that have the same expected life time to the same stream. The life time of the data is the period from generation of data to deletion or update of the same data. Data having the same expected life time are interpreted as a data group which can be invalidated at almost the same time by deleted or updated of the data. For example, data associated with a single file may be treated as data that have the same expected life time.

The controller 4 writes data associated with a specified stream to the same erase block. The data associated with the specified stream are data with an ID of the specified stream, that is, data with a stream identifier of the specified stream. The ID of the specified stream is included in a write command which requests the stream write operation.

In the erase block to which the data associated with the specified stream are written, data unassociated with the specified stream are not written. That is, the controller 4 writes different data groups corresponding to different streams to different erase blocks.

The stream write operation increases a possibility of simultaneous invalidation of the entire data in the same erase block by unmapping or overwriting. This is because the data that have the same expected life time are very likely deleted or updated simultaneously by the host 2.

As to the erase blocks from which the entire data are invalidated, they can become free blocks only by erasing the erase blocks without performing any copy (date movement). As a result, the stream write operation can suppress the frequency of the garbage collection operation performed to increase the number of free blocks.

A rule of issuance of a stream ID (ID issuance policy) may sometimes depend on individual applications.

For example, to determine data to be associated with the same stream, a rule that different kinds of data (for example, system data and user data) are allocated to different stream IDs may be adopted.

Alternatively, a rule that a normal write request is used for writing a specific kind of data (for example, system data) and a stream write request is used for writing a different kind of data (for example, user data) may be adopted.

However, the rule adopted by an application program is not always a proper one, and improper rule may be adopted in some cases.

A proper rule means a rule that only the data that can be simultaneously invalidated are allocated to the same stream.

An improper rule means a rule that the data that can not be simultaneously invalidated are allocated to the same stream.

For example, a simple rule that system data and user data are allocated to different stream IDs will be improper if an application program treats two kinds of user data that actually have different life times. This is because the two different user data having the different life times may possibly be associated with the same stream.

If the rule adopted by an application program is a proper one, a possibility that the data written to the same erase block by the stream write operation are simultaneously invalidated becomes high. In this case, the erase block can be made a free block without a garbage collection, that is, only with an erase.

On the other hand, if the rule adopted by an application program is an improper one, data that actually have different life times may be allocated to the same stream as described above. In this case, the entire data written to the same erase block are not invalidated simultaneously and partial effective data may reside in the erase block. As a result, the erase block may be a target of the garbage collection.

Therefore, if the data that are not invalidated simultaneously are associated with the same stream based on an improper rule, an advantage of suppressing the garbage collection operation cannot be achieved.

In order to write data of different streams to different erase blocks, the controller 4 needs to secure erase blocks of the number of opened stream IDs (write-destination erase block).

Now, a case where two streams (a stream of ID=1 and a stream of ID=2) are used is considered. In this case, the controller 4 needs to secure two erase blocks corresponding to the two streams. The controller 4 writes data associated with the stream of ID=1 to the erase block allocated to the stream of ID=1. Data which are unassociated with the stream of ID=1 are not written to the erase block allocated to the stream of ID=1. Furthermore, the controller 4 writes data associated with the stream of ID=2 to the erase block allocated to the stream of ID=2. Data which are unassociated to the stream of ID=22 are not written to the erase block allocated to the stream of ID=2.

As above, a specific erase block is allocated to each stream used.

Thus, if a stream to which data that actually have different life times are associated is used, an advantage of suppressing the garbage collection may not be expected, and for the worse, the frequency of the garbage collection operation may increase since the amount of free area in the SSD 3 becomes small, and the performance and life span of the SSD 3 may be deteriorated.

Therefore, in the present embodiment, the controller 4 has a function to provide the host 2 with information indicative of effectiveness and ineffectiveness of a stream write operation (feedback information).

The controller 4 may determine ineffectiveness of stream write operation of a stream if an erase block to which data associated with the stream are written is targeted for the garbage collection operation.

That is, as the above feedback information, the controller 4 provides the host 2 with the information that indicates whether or not an erase block to which data associated with the stream from the host 2 are written but data unassociated with the stream are not written is used for the garbage collection operation of the NAND memory 5.

The feedback information is not information indicating the entire erase blocks used for the garbage collection operation but is information that indicates whether or not erase blocks allocated to the stream write operation are used for the garbage collection operation.

The feedback information may be stored in a storage area in the SSD 3. In this case, the controller 4 may provide the host 2 with the feedback information (transfer the feedback information to the host 2) in response to a read request of the feedback information from the host 2.

For example, the controller 4 may provide the host 2 with, as the feedback information, both ID of the stream which performed ineffectively and ID of the stream which performed effectively. The ID of the stream which performed effectively is ID of stream to which erase block whose entire data are invalidated simultaneously has been allocated.

Otherwise, the controller 4 may provide the host 2 with, as the feedback information, information only indicating ID of the stream which performed ineffectively (that is, ID of the stream to which erase block used for the garbage collection operation has been allocated). This reduces the data amount of the feedback information and only usable information can efficiently be supplied to the host 2.

The host 2 sends a write command which requests that the data associated with a specified stream be written to the same erase block to the SSD 3. The write command includes an ID of the specified stream. When the host 2 receives the feedback information from the SSD 3, the host 2 then automatically adjusts a policy for sending a write command including the ID of the specific stream, based on the feedback information. For example, if the feedback information indicates that the erase block to which the data of the specified stream is written has been used for the garbage collection operation, the host 2 adjusts the write command sending policy to suppress the sending of write command including the ID of the specified stream.

For example, the host 2 may specify an application program which requested issuance of an ID of a stream which performed ineffectively, and execute a policy adjustment process to prohibit any later use of the stream write operation by this application program.

In this case, the host 2 may replace any later request for the stream write operation from the specified application program with a request for the normal write operation.

Alternatively, the issuance of a stream ID may not be performed by an application program but may be performed by an operating system 41 itself of the host 2 based on a rule (policy). In this case, the operating system 41 of the host 2 may adopt a rule (policy). In this rule (policy), if the number of files created within a certain period is greater than or equal to a threshold value (threshold number), then the stream write (of the same ID) is used to write data associated with the files. If the number of files created within the certain period is less than the threshold value, then the normal write is used to write data associated with the files. This rule is established based on an idea that file creation and file deletion have a temporal locality and a file group created simultaneously may probably be deleted simultaneously.

If the feedback information from the SSD 3 indicates ineffectiveness of the stream write operation, the host 2 may execute a policy adjustment process to further tighten the condition to grant the sending of write command for the stream write operation. The policy adjustment process may raise the threshold value.

Next, the structure of the controller 4 will be explained.

The controller 4 includes a host interface 11, CPU 12, NAND interface 13, DRAM interface 14, and SRAM 15. The CPU 12, NAND interface 13, DRAM interface 14, SRAM 15 are interconnected via a bus 10.

The host interface 11 receives commands (write command, read command, UNMAP command, and the like) from the host 2. The write command requests the SSD 3 to write data (logical blocks) designated by the write command. The write command includes a logical block address (LBA) of the first logical block to be written and a transfer length (the number of logical blocks).

The write command may be divided into a write command to request the stream write operation and a write command to request the normal write operation. The write command to request the stream write operation may be a WRITE (32) command. A type of write command to request the stream write operation is not limited thereto.

The WRITE (32) command may include an ID of a stream in addition to the above-mentioned LBA and transfer length which are used to designate write data. The ID of the stream indicates a stream with which data to be written is associated. The data to be written (i.e., write data) is designated by the LBA and transfer length in the WRITE (32) command. That is, the SSD 3 treats the data designated by the LBA and transfer length in the WRITE (32) command as data with the ID of the stream specified by the WRITE (32) command.

The write command to request the normal write operation may be a WRITE (16) command, WRITE (12) command, or the like, instead of the WRITE (32) command. A type of write command to request the normal write operation is not limited thereto. The write command to request the normal write operation does not include any stream ID.

The UMMAP command is a command to notify a logical block address range of an unmap target to the SSD 3. In an ATA or SATA, a trim command is used instead of the unmap command to notify the logical block address range of an unmap target to the SSD 3.

The CPU 12 is a processor configured to control the host interface 11, NAND interface 13, DRAM interface 14, and SRAM 15. The CPU 12 executes a command process to process the commands from the host 2, in addition to the above-mentioned FTL layer process. Furthermore, the CPU 12 executes a stream information collection process. In the stream information collection process, the CPU 12 collects the feedback information such as information that indicates whether or not erase blocks allocated for the stream write operation have been used for the garbage collection operation, and provides the host 2 with the feedback information.

The FTL layer process, command process, and stream information collection process may be controlled by firmware executed by the CPU 12. The firmware instructions cause the CPU 12 to function as a write operation control unit 21, stream management unit 22, unmap control unit 23, garbage collection control unit 24, and stream information collection unit 25.

The write operation control unit 21 selectively executes the normal write operation or the stream write operation in response to the write command from the host 2.

Now, a case where a stream of ID=1 and a stream of ID=2 are opened by a request from the host 2 is considered. In the stream write operation, the write operation control unit 21 writes data with ID=1 (data associated with the stream of ID=1) to an erase block allocated to the stream of ID=1, and writes data with ID=2 (data associated with the stream of ID=2) to a different erase block allocated to the stream of ID=2.

In the normal write operation, the write operation control unit 21 writes data without an ID of any stream to an erase block not allocated to a stream.

The stream management unit 22 records stream management information in a stream management table 33 in the DRAM 6. The stream management information is a log kept by the stream management unit 22, and indicates the correspondence between IDs of several opened streams and several erase blocks to which data with IDs of the opened streams are written.

The unmap control unit 23 invalidates data corresponding to the logical block address range of the unmap target specified by the host 2. A lookup table 32 stored in the DRAM 3 stores address mapping information indicating the mapping between LBAs and physical locations (physical addresses) in the NAND memory 5. The address mapping information further includes a flag indicating validity/invalidity of each LBA. The unmap control unit 23 sets a flag corresponding to each LBA in the logical block address range of the unmap target designated by the host 2 to a value indicating invalidity. Thus, the data corresponding to the logical block address range of the unmap target designated by the host 2 can be invalidated.

The garbage collection control unit 24 executes the garbage collection operation of the NAND memory 5. That is, to increase the number of free blocks in the NAND memory 5, the garbage collection control unit 24 collects valid data from a plurality of erase blocks in which valid data and invalid data are mixed, and gathers valid data to one or more specific erase blocks. The garbage collection operation is executed at the time when the number of free blocks of the NAND memory 5 becomes less than or equal to the threshold value. The garbage collection operation may be continued until the number of free blocks reaches or excesses a predetermined number. Furthermore, the garbage collection operation may be executed when the host 2 requests the execution of the garbage collection operation.

The stream information collection unit 25 collects information that indicates whether or not erase block to which data are written by the stream write operation have been used for the garbage collection operation. That is, the stream information collection unit 25 uses information of the erase blocks used in the garbage collection operation and the stream information of the stream management table 33 to collect information of the IDs of streams to which the erase blocks used in the garbage collection operation are allocated.

The erase block to which data are written by the stream write operation is an erase block allocated to the ID of the specified stream. More specifically, this erase block is an erase block to which data associated with the specified stream are written but data unassociated with the stream are not written.

The stream information collection unit 25 provides the host 2 with the collected information as feedback information 34. In this case, the stream information collection unit 25 may store the feedback information 34 to a predetermined storage area such as DRAM 6. Then, the stream information collection unit 25 may provide the host 2 with the feedback information 34 (transfer the feedback information 34 to the host 2) in response to a read request of the feedback information 34 from the host 2.

The NAND interface 13 is a NAND controller configured to control the NAND memory 5 under the control of CPU 12.

The DRAM interface 14 is a DRAM controller configured to control the DRAM 6 under the control of CPU 12.

A part of the storage area of the DRAM 6 may be used as a garbage collection (GC) buffer 31 which temporarily stores the data moved in the garbage collection (GC) operation. Furthermore, the storage area of the DRAM 6 may be used to store the above lookup table 32, stream management table 33, and feedback information 34.

The SRAM 15 may be used as a write buffer which temporarily stores data to be written to the NAND memory 5, or as a read buffer which temporarily stores data read from the NAND memory 5, or the like.

Now, the structure of the host 2 will be explained.

The host 2 is an information processing apparatus which executes various programs. An operating system (OS) 41 of the host 2 manages file creation, save, update, and delete, for example. The OS 41 supports the stream write operation. When the OS 41 receives a stream write request from application program APL0 or APL1, the OS 41 generates the WRITE (32) command including an ID of a target stream specified by the stream write request. Then, the OS 41 sends the WRITE (32) command to the SSD 3.

The host 2 further includes a stream management unit 42 and a policy adjustment unit 43 as function modules to manage the stream write operation.

The stream management unit 42 generates stream management information. The stream management information is a log kept by the host 2, and indicates the correspondence between the application program which requested the stream write operation (that is, the application program which issued the stream write request) and ID of the target stream issued from the OS 41 to the SSD 3.

The policy adjustment unit 43 executes a process to adjust the policy for controlling a sending of the write command which requests that data associated with a specified stream be written to the same erase block, based on the feedback information 34 from the SSD 3. If, for example, an erase block allocated to an ID of a stream issued by a specific application program is used for the garbage collection, the policy adjustment unit 43 may execute a process to replace any stream write request, which includes the ID of the same stream and is issued thereafter by this specific application program, with a normal write request. Alternatively, the policy adjustment unit 43 may execute a process to replace all stream write requests issued thereafter from this specific application with normal write requests. Thereby, WRITE

(32) commands that do not function effectively can be prevented from being sent to the SSD 3.

Alternatively, for example, if the OS 41 currently adopts a policy that data corresponding to a file group which has the number of files greater than or equal to a first threshold number and is created within a predetermined period are written by the stream write operation, the stream management unit 42 may generate stream management information indicating the correspondence between an ID of the policy currently being adopted and an ID of the stream issued from the OS 41 to the SSD 3. If the OS 41 determines that the stream write operation does not function effectively based on the feedback information 34 from the SSD 3, the policy adjustment unit 43 may change the policy to be adopted to a different policy with a second threshold number which is greater than the first threshold number.

As above, in the present embodiment, the feedback information 34 from the SSD 3 to the host 2 is used to suppress WRITE (32) commands which are seemingly ineffective from being sent to the host 2.

The functions of the stream management unit 42 and the policy adjustment unit 43 may be incorporated in the OS 41.

FIG. 2 shows an example of the garbage collection operation executed by the garbage collection control unit 24 of the SSD 3.

FIG. 2 shows an example of the garbage collection operation in which five erase blocks are chosen as targets for the garbage collection operation. The garbage collection control unit 24 in FIG. 1 chooses several erase blocks as target blocks for the garbage collection operation from erase blocks in which valid data (that is, valid pages) and invalid data (that is, invalid pages) are mixed. The garbage collection control unit 24 may choose erase blocks having less valid data ratio from erase blocks filled with the valid data and the invalid data, by referring to a lookup table 32. The garbage collection control unit 24 reads valid data alone from each erase block targeted for the garbage collection operation. The data read from the block may be temporarily stored in the GC buffer 31.

In the example of FIG. 2, there are two free blocks in addition to the five erase blocks include valid data. The garbage collection control unit 24 may copy the entire valid data in the five erase blocks into these two free blocks. Thereby, the entire valid data are collected in the two free blocks. These two free blocks are filled with the valid data.

Then, the garbage collection control unit 24 erases the five erase blocks with no valid data and set the five erase blocks to free blocks.

After the garbage collection operation, there are two erase blocks filled with the valid data and five free blocks.

FIG. 3 shows the relationship between the number of IDs of the streams used and the number of erase blocks to be secured in the SSD 3.

In FIG. 3, erase block B0 is a current write destination block for the normal write operation. Erase block B1 is allocated for the stream of ID=1. Erase block B1 is used as a write destination block for the stream of ID=1. Data with ID=1 (i.e., data associated with the stream of ID=1) are written to erase block B1. If erase block B1 is filled with data with ID=1 and no more page is available therein, a different erase block is newly allocated for the stream of ID=1. Then, data with ID=1 are written to the erase block newly allocated to the stream of ID=1.

Erase block B2 is allocated for the stream of ID=2. Erase block B2 is used as a write destination block for the stream of ID=2. Data with ID=2 (i.e., data associated with the stream of ID=2) are written to erase block B2. If erase block B2 is filled data with ID2 and no more page is available therein, a different erase block is newly allocated for the stream of ID=2. Then, data with ID=2 are written to the erase block newly allocated to the stream of ID=2.

As can be understood from the above, in the SSD 3, data associated with a specified stream are written to one or more erase blocks allocated to this specified stream.

Figure 4:
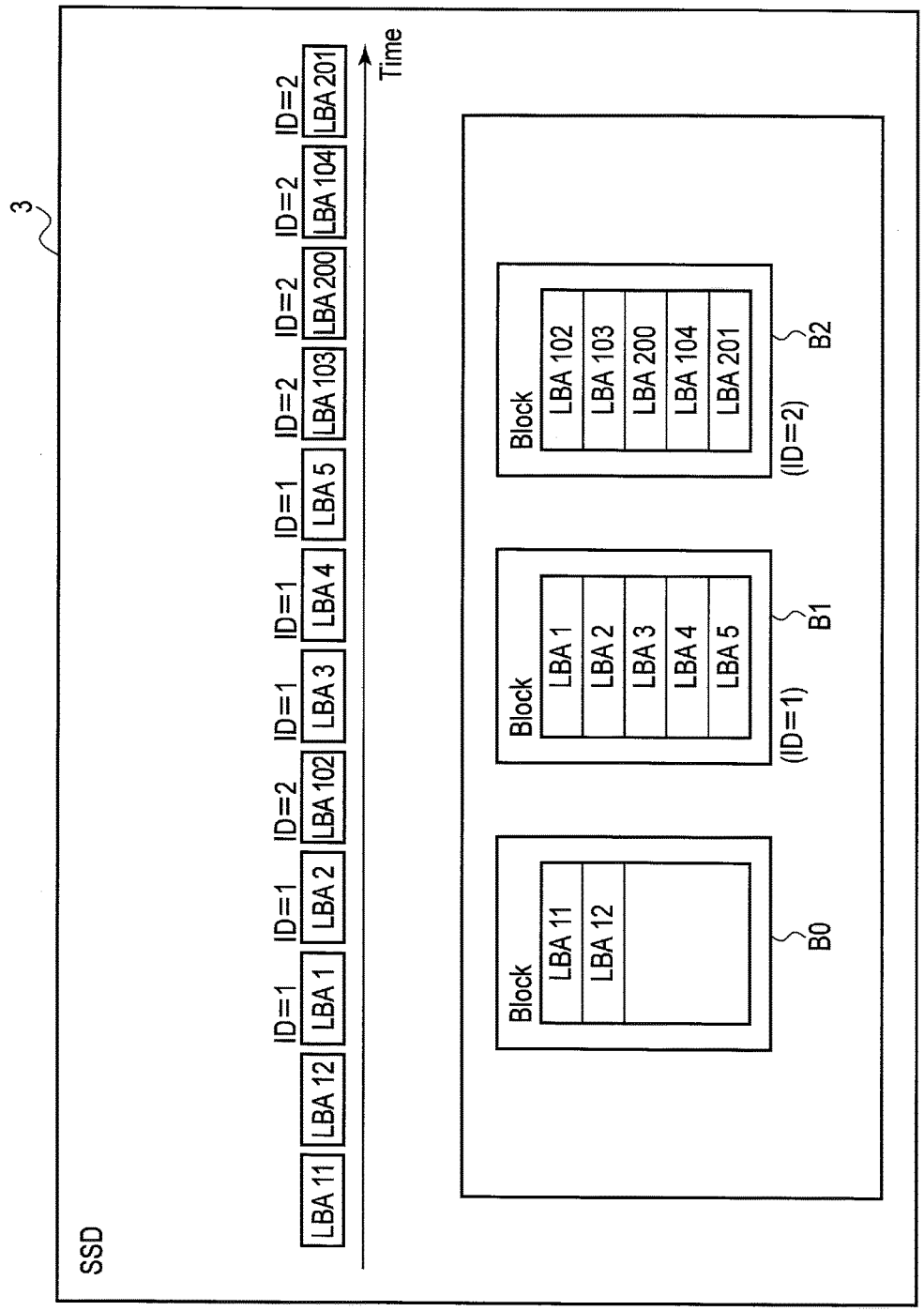
FIG. 4 illustrates an example of a write operation executed by the memory system of the embodiment.

FIG. 4 shows write operations (normal write operation and stream write operation) executed by the write operation control unit 21.

Data associated with no ID (e.g., data designated by LBA 11 and data designated by LBA 12) are written to erase block B0 which is a current write destination block for the normal write operation.

data with ID=1 (e.g., data designated by LBA 1, data designated by LBA 2, data designated by LBA 3, data designated by LBA 4, and data designated by LBA 5) are written to erase block B1 allocated to the stream of ID=1.

data with ID=2 (e.g., data designated by LBA 102, data designated by LBA 103, data designated by LBA 200, data designated by LBA 104, and data designated by LBA 201) are written to erase block B2 allocated to the stream of ID=2.

FIG. 5 shows a process of invalidation of the entire data in an erase block allocated to a specified stream.

Ideally, the entire data in an erase block associated to a specified stream are expected to be simultaneously invalidated by unmapping or overwriting. For example, the host 2 sends an unmap command which designates an LBA range corresponding to the entire data in this erase block to the SSD 3. Thereby, the entire data in the erase block are simultaneously invalidated by the unmap command process. Alternatively, the host 2 may request simultaneous writing (overwriting) to an LBA group corresponding to the LBA group in this erase block. In this case, the entire data in the erase block can be invalidated simultaneously.

However, as mentioned above, there is a possibility that the data having different life times may be associated with the same stream. In that case, the entire data written in the erase block are not invalidated simultaneously and partial valid data may reside in the erase block. If the amount of the valid data in the erase block decreases, the erase block may be chosen as a target for the garbage collection operation. In that case, the valid data in the erase block may possibly be moved to different blocks.

Figures 6, 7:
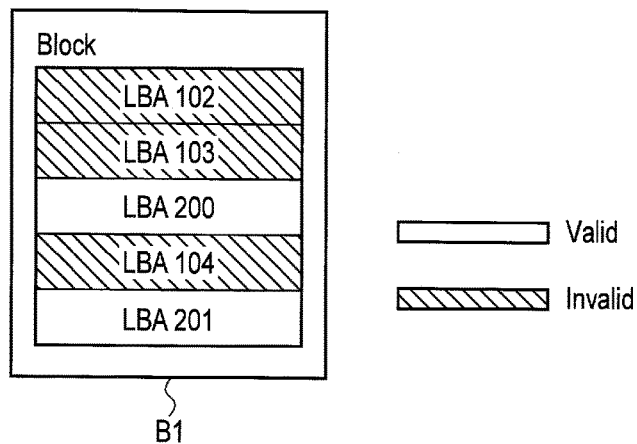
FIG. 6 illustrates an example in which data in an erase block allocated to a specific stream are partially invalidated.
FIG. 7 illustrates an example of a data structure of stream management information managed by a stream management unit of a host of the embodiment.

FIG. 6 shows a state where data in an erase block allocated to a specified stream are partially invalidated.

In FIG. 6, data with ID=2 (data designated by LBA 102, data designated by LBA 103, data designated by LBA 200, data designated by LBA 104, and data designated by LBA 201) are already written to erase block B1.

If the data designated by LBAs 200 and 201 and the data designated by LBA 102 to 104 have the different life times, there is a possibility that the host 2 may issue only an unmap command which designates an LBA range of the LBAs 102 to 104 while not issuing an unmap command which designates an LBA range of the LBAs 200 and 201.

In this case, there are valid data and invalid data mixed in the erase block B1, the erase block B1 may be used for the garbage collection operation.

FIG. 7 shows an example of a data structure of stream management information managed by the stream management unit 42 of the host 2.

A stream management table 44 stores the stream management information indicating the correspondence between names of application programs (or IDs of application programs) and the issued IDs of the streams.

FIG. 7 shows a case where a WRITE (32) command including ID (ID=1) of a specified stream is issued in response to a request from application program APL0, and a WRITE (32) command including ID (ID=2) of another specified stream, WRITE (32) command including ID (ID=3) of still another specified stream, and WRITE (32) command including ID (ID=4) of further still another specified stream are issued in response to a request from application program APL1.

If the host 2 receives, from the SSD 3, feedback information 34 including a list of IDs of streams to which erase blocks used for the garbage collection operation are allocated, respectively, the host 2 refers to a stream management table 44 to specify an application program which issued an ID which did not function effectively.

For example, if IDs which did not function effectively, that is, IDs of the streams to which the erase blocks used for the garbage collection operation are allocated are ID=2 and ID=3, the host 2 can determine that two of three IDs used by the application program APL1 are the IDs which did not function effectively. Since the number of stream IDs which did not function effectively as compared to the number of stream IDs requested by application program APL1 is high, the host 2 may prohibit any later use of the stream write operation by application program APL1. Or the host 2 may prohibit application program APL1 from using the stream write operation for ID=2 and ID=3 but stream write operation for ID=4.

FIG. 8 shows an example of a data structure of the stream management information managed by the SSD 3.

The stream management table 33 stores stream management information indicating the correspondence between IDs of streams and erase blocks to which data with the IDs of the streams are written.

FIG. 8 shows a case where erase blocks B1, B3, and B4 are used for writing data associated with the stream of ID=1, and erase block B2 is used for writing data associated with the stream of ID=2.

If erase block B2 is used for the garbage collection operation by the garbage collection control unit 24, the stream information collection unit 25 can recognize that erase block B2 used for the garbage collection operation is allocated to the stream of ID=2, based on the stream management table 33.

FIG. 9 shows another example of the data structure of the stream management information managed by the SSD 3.

The stream management table 33 stores stream management information indicating the correspondence between IDs of streams, IDs of application programs which issued the IDs of the streams, and erase blocks to which data with the IDs of the streams are written. When the streams are opened, IDs of the applications which use the streams are sent from the host 2 to the SSD 3 individually. An ID of an application program which issued an ID of a specified stream may be included in the above WRITE (32) command from the host 2.

If erase block B2 is used for the garbage collection operation by the garbage collection control unit 24, the stream information collection unit 25 can recognize that erase block B2 used for the garbage collection operation is allocated to the stream of ID=2 and that application program APL1 issued ID=2, based on the stream management table 33. The stream information collection unit 25 may provide the host 2 with the feedback information 34 including a list of IDs of the streams to which erase blocks used for the garbage collection operation were allocated and a list of IDs of the applications corresponding to the stream IDs. Thereby, even if the host 2 is designed to grant a reuse of ID of the stream used in past by an application program to a different application program, the host 2 can correctly specify an application program which issued an ID of the stream that did not function effectively based on the feedback information 34.

Note that the SSD 3 may generate hash values from the contents of WRITE (32) command and use the hash values instead of the application program ID. In that case, the stream management table 33 stores stream management information indicating the correspondence between IDs of streams, hash values of the WRITE (32) command which requested opening of the streams, and erase blocks to which data with the IDs of the streams are written. The stream information collection unit 25 may provide the host 2 with the feedback information 34 including a list of IDs of the streams to which erase blocks used for the garbage collection operation were allocated and a list of hash values corresponding to the IDs of the streams. The host 2 may record a correspondence between IDs of the opened stream and the hash values of the WRITE (32) command which requested opening of the stream in the stream management table 44 of the host 2. Thereby, the host 2 can specify an application program which issued an ID of the stream that did not function effectively.

FIG. 10 is a flowchart which shows a write command process executed by the SSD 3.

The controller 4 of the SSD 3 receives a write command from the host 2 (step S11). The controller 4 determines whether or not the received write command includes an ID of a stream, that is, determines whether or not data designated by the received write command are data with an ID of a stream (step S12).

When the received write command includes ID of a specified stream (YES in step S12), the controller 4 executes the stream write operation (step S13). In step S13, the controller 4 transfers data designated by an LBA and a transfer length in the received write command from a data-out buffer of the host 2. Then, the controller 4 writes the data to a next available page in the erase block allocated to this stream. Furthermore, the controller 4 updates the lookup table 32 to record a physical location(s) of the data corresponding to an LBA range designated by the write command in the lookup table 32.

When the received write command does not include ID of any stream (NO in step S12), the controller 4 executes the normal write operation (step S14). In step S14, the controller 4 transfers data designated by an LBA and a transfer length in the received write command from the data-out buffer of the host 2. Furthermore, the controller 4 writes the data to a next available page in the erase block currently being used for the normal write operation. Furthermore, the controller 4 updates the lookup table 32 to record a physical location(s) of the data corresponding to an LBA range designated by the write command in the lookup table 32.

FIG. 11 is a flowchart which shows an unmap command process executed by the SSD 3.

The controller 4 of the SSD 3 receives an unmap command from the host 2 (step S21). The controller 4 invalidates data corresponding to one or more LBAs which are unmapping targets designated by the received unmap command (step S22). In step S22, the controller 4 updates the lookup table 32 and sets a flag corresponding to each unmapping target LBA designated by the host 2 to an invalid value.

FIG. 12 is a flowchart which shows a garbage collection operation executed by the SSD 3.

If the controller 4 of the SSD 3 determines that the number of remaining free blocks becomes less than a threshold value (YES in step S31), or if the controller 4 receives a garbage collection request (GC request) from the host 2 (YES in step S32), the controller 4 starts the garbage collection operation.

The controller 4 chooses an erase blocks to be targeted for the garbage collection and uses the erase blocks to collect valid data in several erase blocks (step S33). Then, after the copy of valid data to the erase blocks, the controller 4 erases other erase blocks including invalid data only to create free blocks (step S34).

Figure 13:
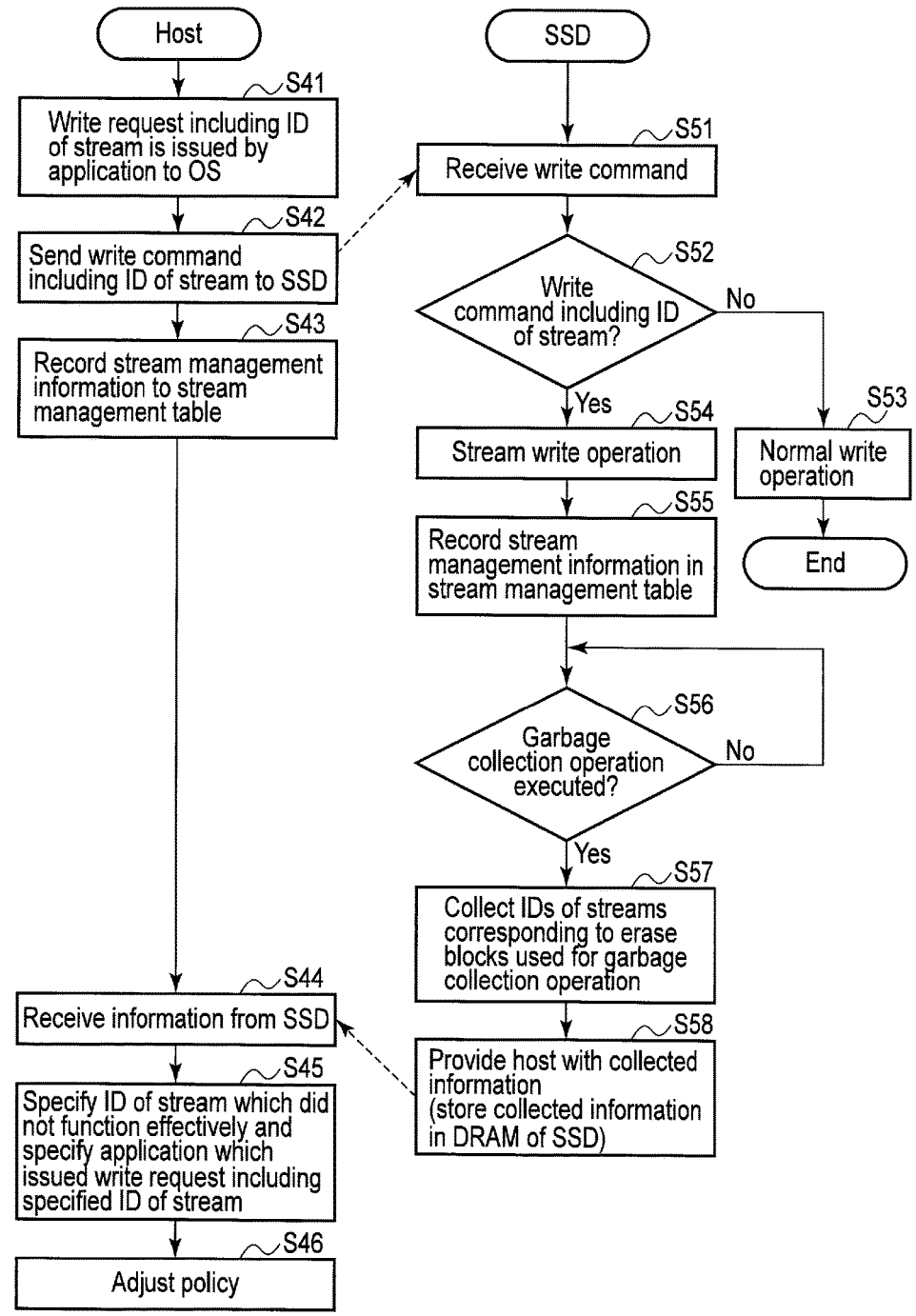
FIG. 13 is a flowchart which illustrates an example of a series of processes in stream write operation control executed by the memory system and the host of the embodiment.

FIG. 13 is a flowchart which shows a series of processes in the stream write operation executed by the SSD 3 and the host 2.

An application program issues a stream write request, that is, a write request including an ID of a stream to the OS 41 (step S41). The OS 41 issues (sends) a write command (WRITE (32) command) including the ID of the stream to the SSD 3. The stream management unit 42 of the host 2 records stream management information indicating the correspondence between the application program and the issued ID of the stream in the stream management table 44 of the host 2 (step S43).

The controller 4 of the SSD 3 receives a write command from the host 2 (step S51). The controller 4 determines whether or not the received write command includes an ID of a stream (step S52).

When the received write command does not include an ID of a stream (NO in step S52), the controller 4 executes the normal write operation (step S53).

On the other hand, when the received write command includes an ID of a stream (YES in step S52), the controller 4 executes the stream write operation to write data to be written to an erase block to allocated to the ID of the stream (step S54). Furthermore, the controller 4 records stream management information indicating the correspondence between the ID of the stream and the erase block to which the data are written in the stream management table 33 of the SSD 3 (step S55).

The controller 4 executes the garbage collection operation if necessary. If the garbage collection operation is executed (YES in step S56), the controller 4 refers to the stream management table 33 of the SSD 3 to collect information of IDs of streams to which erase blocks used for the garbage collection operation are allocated respectively (step S57). The controller 4 provides the host 2 with the collected information as feedback information 34 (step S58). As mentioned above, the feedback information 34 may be composed of a list of IDs of streams to which erase blocks used for the garbage collection operation are allocated respectively.

In step S58, the controller 4 may transfer the feedback information 34 to the host 2 immediately, or may store the feedback information 34 in the DRAM 6 of the SSD 3 to transfer the feedback information 34 to the host 2 only when a transfer request from the host 2 is received.

The host 2 receives the feedback information 34 from the SSD 3 (step S44). The host 2 specifies IDs of streams which did not function effectively and specifies application programs which issued these specified IDs (step S45). Then, the host 2 adjusts a policy to control sending of the WRITE (32) command including the specified IDs (step S46).

In step S46, the host 2 may change the policy to be adopted from a current policy that requests from any application programs are accepted unconditionally to a policy that a later use of the stream write operation by specified application programs is prohibited. In that case, a later request from the specific application programs is converted to a write command to request the normal write operation.

Figure 14:
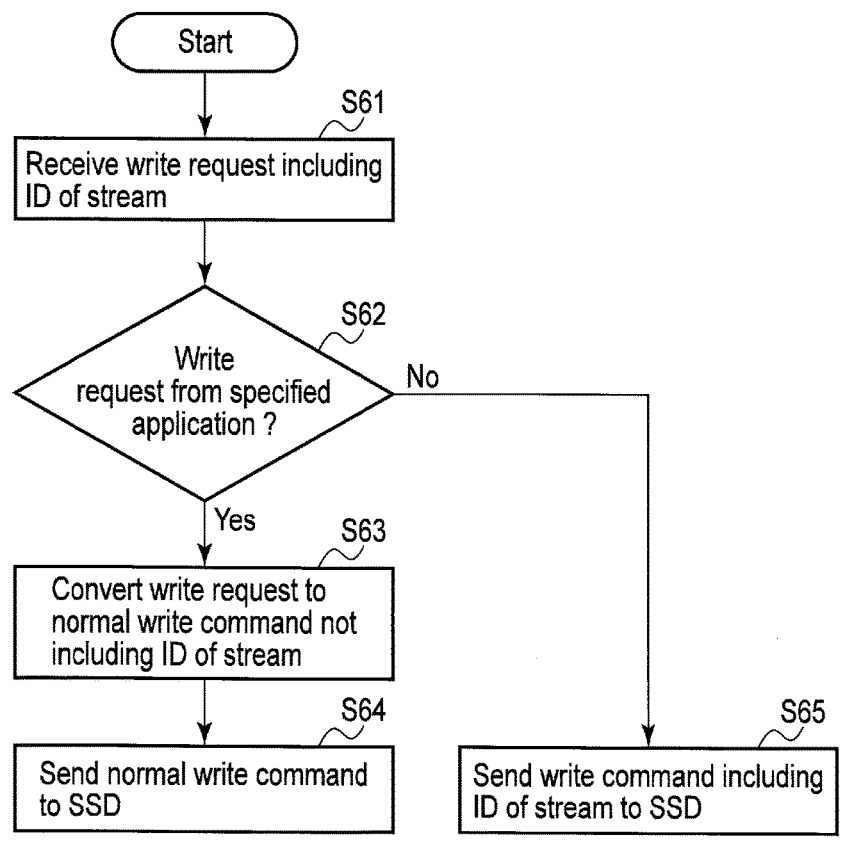
FIG. 14 is a flowchart which illustrates an example of a write command conversion process executed by the host of the embodiment.

FIG. 14 is a flowchart which shows a write command conversion process executed by the OS 41 of the host 2.

The OS 41 receives a stream write request, that is, a write request including an ID of a stream from an application program (step S61). The OS 41 determines whether or not the received write request (stream write request) is a write request (stream write request) from the specified application programs (step S62).

If the received write request (stream write request) is a write request (stream write request) from the specified application program (YES in step S62), the OS 41 converts the write request (stream write request) to a normal write command not including an ID of a stream (step S63). Furthermore, the OS 41 issues the normal write command to the SSD 3 (step S64).

On the other hand, if the received write request (stream write request) is not a write request (stream write request) from the specified application program (NO in step S62), the OS 41 issues (sends) a write command (WRITE (32) command) including the ID of the stream designated by the received write request (stream write request) to the SSD 3 (step S65).

Figure 15:
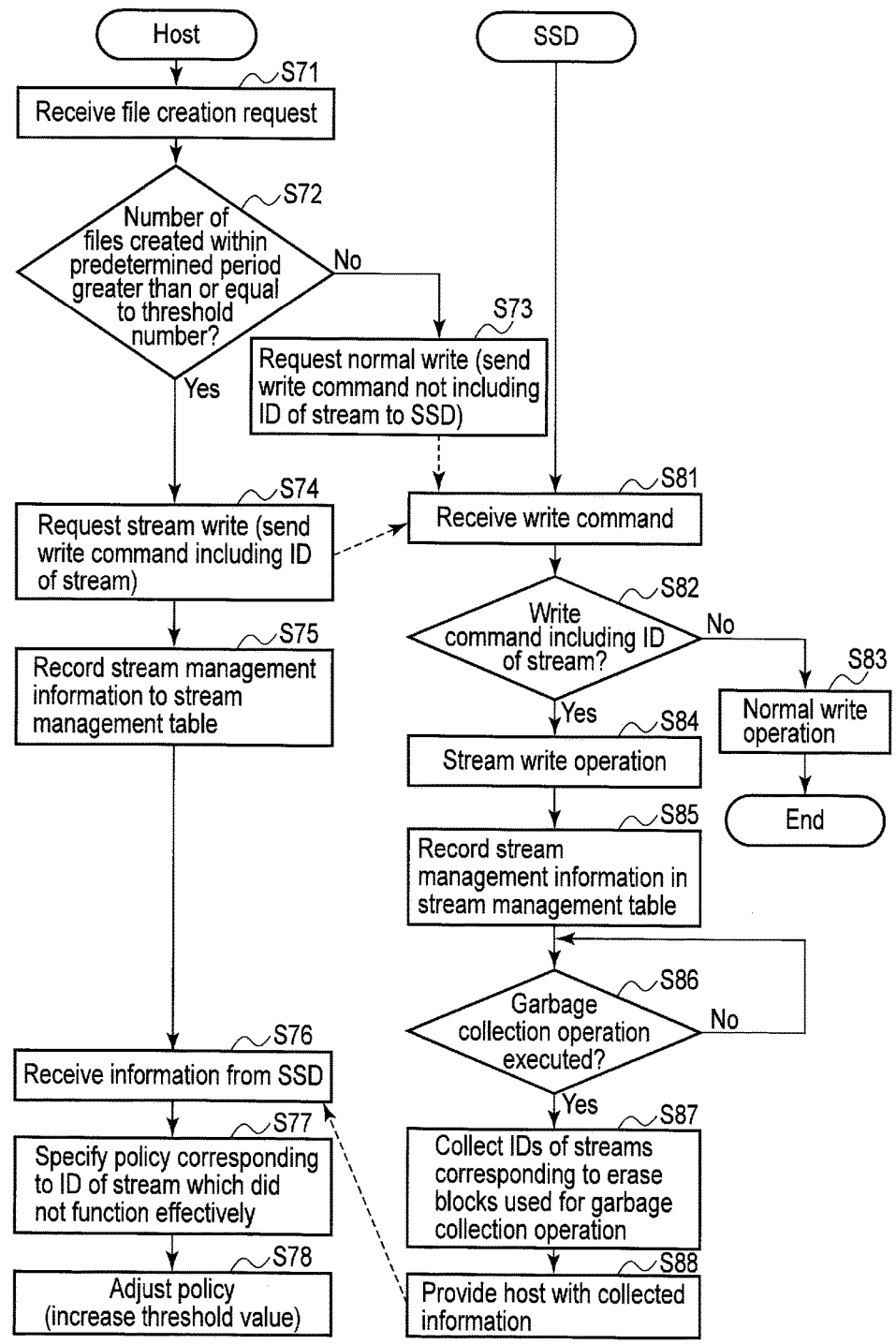
FIG. 15 is a flowchart which illustrates another series of processes in the stream write operation control executed by the memory system and the host of the embodiment.

FIG. 15 is a flowchart which shows another series of processes in the stream write operation executed by the SSD 3 and the host 2.

Here, a case where the OS 41 uses its own policy to perform issuance of stream IDs is given.

The OS 41 receives a file creation request from an application program (step S71). The OS 41 determines whether or not the number of files created within a predetermined period is greater than or equal to a threshold number designated by the current policy (step S72).

If the number of files created within the predetermined period is less than the threshold number designated by the current policy (NO in step S72), the OS 41 issues a write command not including an ID of a stream to the SSD 3 and requests the SSD 3 to perform the normal write operation (step S73).

On the other hand, if the number of files created within the predetermined period is greater than or equal to the threshold number designated by the current policy (YES in step S72), the OS 41 issues a write command including an ID of a stream to the SSD 3 and requests the SSD 3 to perform the stream write operation (step S74). The host 2 records stream management information indicating the correspondence between the current policy and the issued ID of the stream in the stream management table 44 of the host 2 (step S75). For example, if the current policy is policy #1 and there are two IDs of ID=1 and ID=2 issued under the control of policy #1, the stream management table 44 records the stream management information as shown in FIG. 16.

The controller 4 of the SSD 3 receives a write command from the host 2 (step S81). The controller 4 determines whether or not the received write command includes an ID of a stream (step S82).

When the received write command does not include an ID of a stream (NO in step S82), the controller 4 executes the normal write operation (step S83).

On the other hand, when the received write command includes an ID of a stream (YES in step S82), the controller 4 executes the stream write operation to write data to be written to an erase block to allocated to the ID of the stream (step S84). Furthermore, the controller 4 records stream management information indicating the correspondence between the ID of the stream and the erase block to which the data are written in the stream management table 33 of the SSD 3 (step S85).

The controller 4 executes the garbage collection operation if necessary. IF the garbage collection operation is performed (YES in step S86), the controller 4 refers to the stream management table 33 of the SSD 3 to collect information of IDs of streams to which erase blocks used for the garbage collection operation are allocated respectively (step S87). The controller 4 provides the host 2 with the collected information as the feedback information 34 (step S88). As mentioned above, the feedback information 34 may be composed of a list of IDs of streams to which erase blocks used for the garbage collection operation are allocated respectively.

In step S88, the controller 4 may transfer the feedback information 34 to the host 2 immediately, or may store the feedback information 34 in the DRAM 6 of the SSD 3 to transfer the feedback information 34 to the host 2 only when a transfer request from the host 2 is received.

The host 2 receives the feedback information 34 from the SSD 3 (step S76). The host 2 specifies IDs of streams which did not function effectively and a policy used for the issuance of the IDs of these streams based on the feedback information 34 and the stream management table 44 of the host 2 (step S77). Furthermore, the host 2 changes the policy currently being used to a different policy including a threshold value which is larger than that of the specified policy (step S78).

Figure 17:
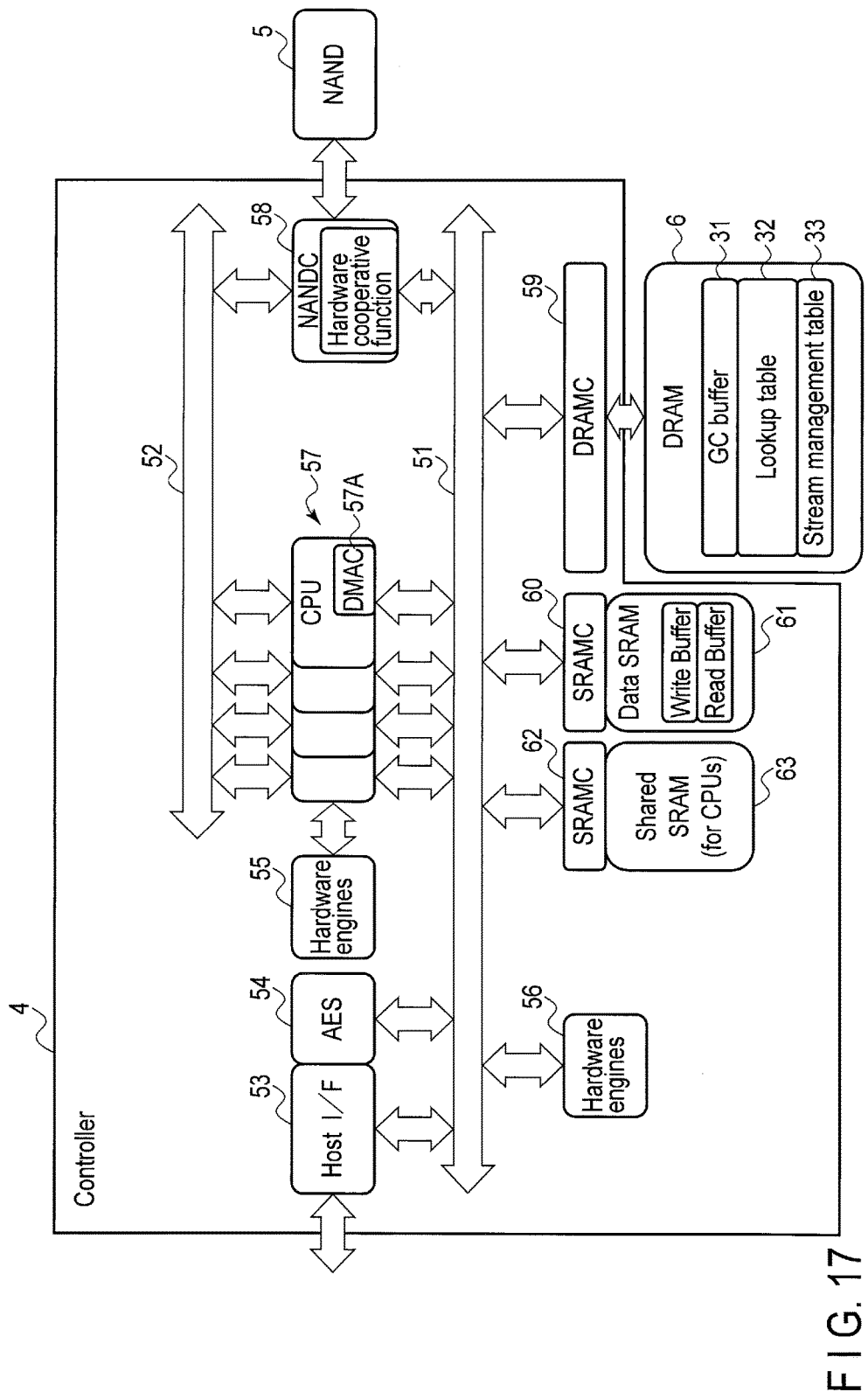
FIG. 17 is a block diagram which illustrates an example of a hardware structure of the memory system of the embodiment.

FIG. 17 shows an example of a hardware structure of the SSD 3.

The controller 4 of the SSD 3 includes, for example, a main bus 51, message communication path 52, host interface 53, encryption/decryption unit (advanced encryption standard (AES)) 54, hardware engines 55 and 56, four CPUs 57, NAND controller (NANDC) 58, DRAM controller (DRAMC) 59, SRAM controller (SRAMC) 60, SRAM 61, SRAM controller (SRAMC) 62, and SRAM 63.

The main bus 51 corresponds to the bus 10 in FIG. 1. The message communication path 52 is used for message communication between the four CPUs 57 and the NAND controller (NANDC) 58. The host interface 53 corresponds to the host interface 11 in FIG. 1. In the data write operation, the encryption/decryption unit (AES) 54 encrypts write data (plain text) received from the host interface controller 53. In the data read operation, the encryption/decryption unit (AES) 54 decrypts the encrypted data read from the NAND memory 5. Note that write data and read data can be transferred without any intervention by the encryption/decryption unit 54 if necessary.

The hardware engines 55 and 56 are hardware circuits configured to execute a process of high load.

The four CPUs 57 execute processes of the CPU 12 in FIG. 1 in parallel. Each CPU 57 comprises a DMA controller (DMAC) 57A. The NAND controller (NANDC) 58 corresponds to the NAND interface 13 in FIG. 1. The NAND controller (NANDC) 58 may include a hardware cooperative function for transferring data without intervention by the CPU 57.

The DRAM controller (DRAMC) 59 corresponds to the DRAM interface 14 in FIG. 1. The SRAM 61 and 63 correspond to SRAM 15 in FIG. 1. The SRAM 61 has a storage area which is used as a write buffer and a read buffer. The write buffer stores write data temporarily until write data of certain data size suitable for the NAND memory 5 are stored. The read buffer stores data read from the NAND memory 5 temporarily. The SRAM 63 has a storage area which is used for communication between the CPUs 57.

FIG. 18 shows an example of a hardware structure of information processing apparatus 100 functioning as the host 2.

The information processing apparatus 100 can be realized as, for example, a desktop computer, notebook computer, or server. The information processing apparatus 100 includes, for example, a processor (CPU) 101, main memory 102, BIOS-ROM 103, graphics processing unit (GPU) 104, network controller 105, peripheral interface controller 106, Serial Attached SCSI (SAS) controller 107, embedded controller (EC) 108, and input device 109.

The processor 101 is a CPU configured to control operations of each component in the information processing apparatus 100. The processor 101 executes various programs loaded in the main memory 102. The main memory 102 is composed of a volatile memory such as DRAM. Programs executed by the processor 101 include the OS 41 and various application programs. The OS 41 executes the functions of the stream management unit 42 and the policy adjustment unit 43 those are described in the section related to FIG. 1.

Furthermore, the processor 101 executes a basic input/output system (BIOS) stored in the BIOS-ROM 103 which is a nonvolatile memory. The BIOS is a system program used for hardware control.

The GPU 104 is a display controller configured to control a display 200 used as a display monitor of the information processing apparatus 100. The display 200 may be an internal display attached to a casing of the information processing apparatus 100 or may be external display connected to the casing of the information processing apparatus 100 via a cable. The GPU 104 uses a part of storage area of the main memory 102 or a dedicated memory as a video memory, and generates display signals to be supplied to the display 200 from display data stored in the video memory.

The network controller 105 is a communication device such as a wired LAN controller or a wireless LAN controller. The peripheral interface controller 106 is configured to execute communication with peripheral devices such as a USB device and the like.

The SAS controller 107 is configured to execute communication with a device connected to an SAS connector 107A. In the present embodiment, the SSD 3 is connected to the SAS connector 107A. The SSD 3 functions as a main storage of the information processing apparatus 100.

The EC 108 is a system controller configured to execute power management of the information processing apparatus 100. The EC 108 turns on/off the information processing apparatus 100 corresponding to a power switch operation by a user. The EC 108 is realized as a processing circuit such as a single-chip microcontroller. The EC 108 may include a keyboard controller to control an input device such as a keyboard.

In the information processing apparatus 100, the processor 101 executes the following processes under the control of the OS 41.

The processor 101 allocates data that have the same expected life time to a specified stream. Then, the processor 101 sends, to the SSD 3, a write command (WRITE (32) command) which requests that data associated with the specified stream are written to the same erase block. The WRITE (32) command includes an ID of the specified stream. The WRITE (32) command is sent to the SSD 3 via the SAS controller 107. The SSD 3 processes the WRITE (32) command to execute the stream write operation.

The processor 101 receives the feedback information from the SSD 3. The feedback information includes information that indicates whether or not the erase block to which data associated with the specified stream are written is used for garbage collection. The processor 101 can confirm if the specified stream functions effectively based on the feedback information. A fact that the erase block to which data associated with the specified stream are written is used for the garbage collection means that the specified stream does not function effectively.

The processor 101 automatically adjusts a policy to control a sending operation of the write command (WRITE (32) command) including the ID of the specified stream, based on the feedback information from the SSD 3. For example, if the specified stream does not function effectively, the processor 101 adjusts the policy to suppress the sending operation of the write command (WRITE (32) command) including the ID of the specified stream.

As above, the information processing apparatus 100 suppresses the sending operation of WRITE (32) commands that are considered ineffective for decreasing frequency of the garbage collection. Consequently, unnecessary consumption of free spaces in the SSD 3 can be reduced and the life span of the SSD 3 can be prolonged.

Figure 19:
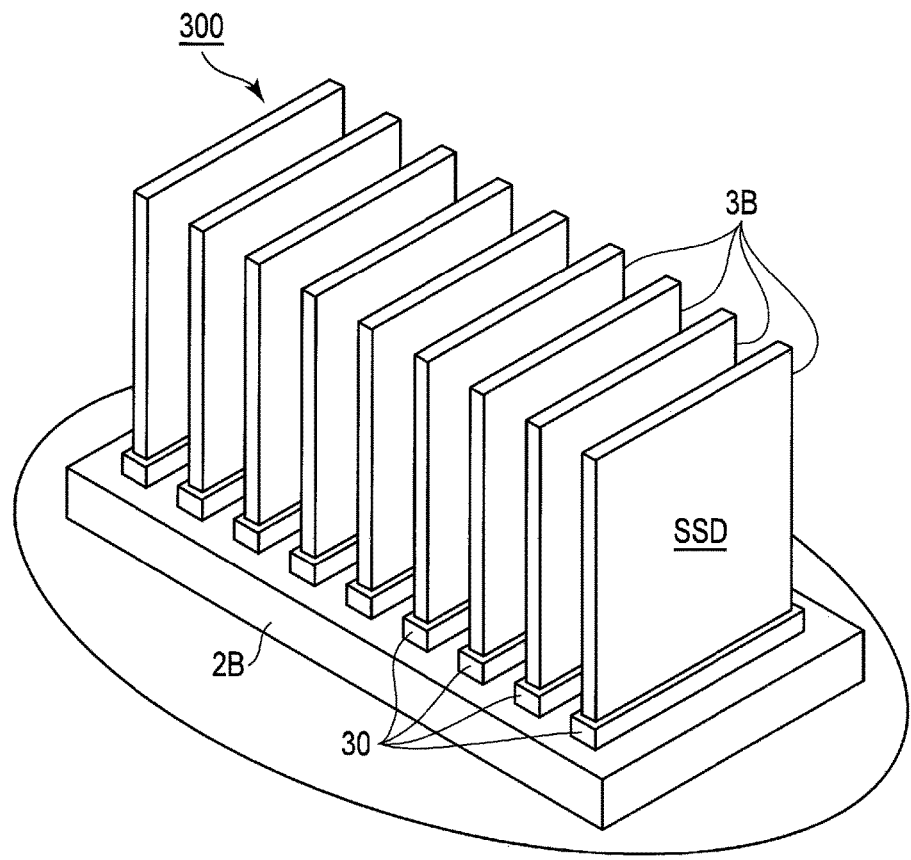
FIG. 19 illustrates a structural example of a storage system including the memory system of the embodiment.

FIG. 19 shows a structural example of a storage system 300 structured with SSDs 3.

The storage system 300 comprises a large number of SSDs 3B. Each of SSDs 3B functions the same as the SSD 3.

The storage system 300 is an enterprise SSD (eSSD) which can be used as storage of a server computer 2B in a data center.

Each SSD 3B is realized as a relatively small module of which outer dimensions are approximately 20×30 mm. The body of the server computer 2B includes a plurality of connectors (slots) 30. Each connector 30 may be a Serial Attached SCSI (SAS) connector. The SAS connector allows high speed communication between the computer 2B and each SSD 3B using a dual port of 6 G bps. Alternatively, each connector 30 may be a PCI Express (PCIe) or an NVM Express (NVMe) connector.

The SSDs 3B are attached to the connectors 30 of the computer 2B individually and are arranged on a surface of the body of the computer 2B in such a manner that they stand substantially vertically. With this structure, the SSDs 3B of a large number can be implemented compactly and the storage system 300 can be miniaturized.

Note that each SSD 3B can be used as a semiconductor memory medium applicable to electronic devices such as a portable computer and a tablet.

Now, an implementation example of the stream information collection unit 25 of FIG. 1 will be explained.

In the present embodiment, the stream information collection unit 25 collects information that indicates whether or not an erase block secured for the stream write operation (i.e., an erase block to which data were written in the stream write operation) was used as a target block for a garbage collection. If the erase block secured for the stream write operation was used as the target block for the garbage collection, there has been a certain difference between actual life times of the data written in the erase block. Therefore, the information that indicates whether or not an erase block to which data were written in the stream write operation was used as the target block for the garbage collection can be interpreted as information of variations in the actual life times of the written data.

The stream information collection unit 25 may collect the following information items in addition to or instead of the information that indicates whether or not an erase block to which data were written in the stream write operation was used as the target block for the garbage collection.

The stream information collection unit 25 may measure a time spent in invalidation of the entire data in the erase block to which data were written in the stream write operation by unmapping or overwriting, and may collect information about the time. For example, the stream information collection unit 25 may measure an actual time between a time when a part of data associated with a specified stream is first invalidated and a time when the last part of the data is invalidated. The actual time indicates a degree of variations in the actual life times of the data associated with the specified stream. The stream information collection unit 25 provides the host 2 with the actual time. The host 2 can confirm the degree of variations in the actual life times of the data associated with the specified stream based on the actual time and can perform suitable policy adjustment.

The stream information collection unit 25 may measure the number of unmapping or overwriting operations issued until the entire data in the erase block to which data were written in the stream write operation were invalidated, and may collect the information about the number. The number can be used as an index which indicates a degree of variations in the actual life time of the data associated with the stream. The stream information collection unit 25 provides the host 2 with the number information. The host 2 can confirm the degree of variations in the actual life times of the data associated with the stream based on the number and can perform suitable policy adjustment.

As can be understood from the above, in the present embodiment, the controller 4 in the SSD 3 provides the host 2 with the feedback information that indicates whether or not an erase block to which data associated with a stream are written but data unassociated with the stream are not written is used in the garbage collection operation. Thus, information effective for suppressing or reducing the issuance of a stream write request which does not function effectively can be supplied to the host 2. Consequently, deterioration of performance and life span of the SSD 3 caused by a stream write operation which has no effect on suppressing frequency of the garbage collection can be suppressed.

Note that the present embodiment uses a NAND memory as a nonvolatile memory for the sake of exemplification. However, the function of the present embodiment can be applicable to various nonvolatile memories having a physical architecture which allows easy creation of free spaces in response to simultaneous invalidation of data written to an erase unit without performing garbage collection to the erase unit. For example, if nonvolatile memories such as magnetoresistive random access memory (MRAM), phase-change random access memory (PRAM), resistive random access memory (ReRAM), and ferroelectric random access memory (FeRAM) have the above physical architecture, the function of the present embodiment can be applied to these nonvolatile memories.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing memory system comprising:
   a memory system: and
   a host device including a processor, the processor programmed to control the memory system,
   the memory system including:
   a nonvolatile memory including a plurality of blocks; and
   a controller circuit configured to:
      write, in response to a write command from the host device that includes an identifier of a first stream, data associated with the write command to a first block allocated to the first stream,
      measure a time period from a time when a part of data stored in the first block was first invalidated to a time when all data stored in the first block were invalidated, and
      send the measured time period to the host device, wherein
      in response to receiving the measured time period, the processor changes a policy to assign an identifier of a stream to data associated with the write command based on the measured time period.

2. The information processing system of claim 1, wherein the controller circuit is further configured to:
   write, in response to a second write command from the host device that includes an identifier of a second stream, data associated with the second write command to a second block allocated to the second stream,
   determine whether or not the second block was subjected to garbage collection, and
   send, to the host device, the identifier of the second stream when it is determined that the second block was subjected to the garbage collection, wherein
   in response to receiving the identifier of the second stream, the processor further changes the policy to assign the identifier of the stream to data associated with the write command.

3. The information processing system of claim 1, wherein the controller circuit is configured to send the measured time period to the host device in response to a request from the host device that is different from the write command.

4. The information processing system of claim 1, wherein the controller circuit is further configured to:
   record stream information indicative of a correspondence between the identifier of the first stream and identifiers of blocks in which data associated with the first stream are stored, and
   determine the correspondence using the stream information.

5. The information processing system of claim 1, wherein the controller circuit is further configured to:
   determine whether or not the first block was subjected to garbage collection, and
   send, to the host device, the identifier of the first stream when it is determined that the first block was subjected to the garbage collection, wherein
   in response to receiving the identifier of the first stream, the processor further changes the policy to assign the identifier of the stream data associated with the write command.

6. The information processing system of claim 1, wherein the processor changes the policy by prohibiting assigning another identifier of stream to data associated with another write command from a first program, the first program being a program from which the write command that includes the identifier of the first stream has been sent.

7. An information processing system comprising:
   a memory system; and
   a host device including a processor, the processor programmed to control the memory system,
   the memory system including:
   a nonvolatile memory including a plurality of blocks; and
   a controller circuit configured to:
      write data associated with a write command received from the host device to a first block in the plurality of blocks that has been allocated to a first stream if the write command includes an identifier of the first stream,
      track a total number of unmapping or overwriting operations that are executed on the first block up until all data that has been stored in the first block is invalidated, and
      send the tracked total number to the host device, wherein
      in response to receiving the tracked total number, the processor changes a policy to assign an identifier of a stream to data associated with the write command based on the tracked total number.

8. The information processing system of claim 7, wherein the controller circuit is further configured to:
   write, in response to a second write command from the host device that includes an identifier of a second stream, data associated with the second write command to a second block allocated to the second stream,
   determine whether or not the second block was subjected to garbage collection, and
   send, to the host device, the identifier of the second stream when it is determined that the second block was subjected to the garbage collection, wherein
   in response to receiving the identifier of the second stream, the processor further changes the policy to assign the identifier of the stream to data associated with the write command.

9. The information processing system of claim 7, wherein the controller circuit is further configured to send the tracked number to the host device in response to a request from the host device that is different from the write command.

10. The information processing system of claim 7, wherein
    the controller circuit is further configured to:
       determine whether or not the first block was subjected to garbage collection, and
       send, to the host device, the identifier of the first stream when it is determined that the first block was subjected to the garbage collection, wherein
       in response to receiving the identifier of the first stream, the processor changes the policy to assign the identifier of the stream to data associated with the write command.

11. The information processing system of claim 7, wherein
    the controller circuit is further configured to:
       record stream information indicative of a correspondence between the identifier of the first stream and identifiers of blocks in which data associated with the first stream are stored, and determine the correspondence using the stream information.

12. The information processing system of claim 7, wherein the processor changes the policy by prohibiting assigning another identifier of stream data associated with another write command from a first program, the first program being a program from which the write command that includes the identifier of the first stream has been sent.

13. An information processing system comprising:
a memory system: and
a host device including a processor, the processor programmed to control the memory system,
the memory system including:
a nonvolatile memory including a plurality of blocks; and
a controller circuit configured to:
write data associated with a first stream to a first block allocated to the first stream, wherein the data associated with the first stream have a same expected life time,
detect variations in life times among the data stored in the first block, and send first information indicative of the variations in the life times to the host device, wherein
in response to receiving the first information, the processor changes a policy to assign an identifier of a stream to data associated with the write command based on the first information.

14. The information processing system of claim 13, wherein
the controller circuit is further configured to:
write data associated with a second stream to a second block allocated to the second stream, wherein the data associated with the second stream have a same expected life time,
detect variations in life times among the data stored in the second block, and
send second information indicative of variations in the life times to the host device, wherein
in response to receiving the second information, the processor further changes the policy to assign the identifier of the stream to data associated with a write command.

15. The information processing system of claim 13, wherein
the controller circuit is further configured to send the first information to the host device in response to a request from the host device.

16. The memory information processing system of claim 13, wherein
the controller circuit is further configured to:
record stream information indicative of a correspondence between the identifier of the first stream and identifiers of blocks in which data associated with the first stream are stored, and
determine the correspondence using the stream information.

17. The information processing system of claim 13, wherein
the controller circuit is configured to send the first information to the host device responsive to garbage collection carried out on the first block.

18. The information processing system of claim 13, wherein
the controller circuit is configured to:
measure a time period from a time when a first part of data stored in the first block was invalidated to a time when a second part of data stored in the first block was invalidated, and
send the first information to the host device based on the measured time period.

19. The information processing system of claim 13, wherein
the controller circuit is configured to:
count a number of unmapping or overwriting operations executed to the first block until all data stored in the first block were invalidated, and
send the first information to the host device based on the counted number.

20. The information processing system of claim 13, wherein the processor changes the policy by prohibiting assigning another identifier of stream data associated with another write command from a first program, the first program being a program from which the write command that includes the identifier of the first stream has been sent.

* * * * *